Jan. 14, 1969  P. E. SHERBURN  3,421,294
OIL BATH AIR CLEANER
Filed April 18, 1967
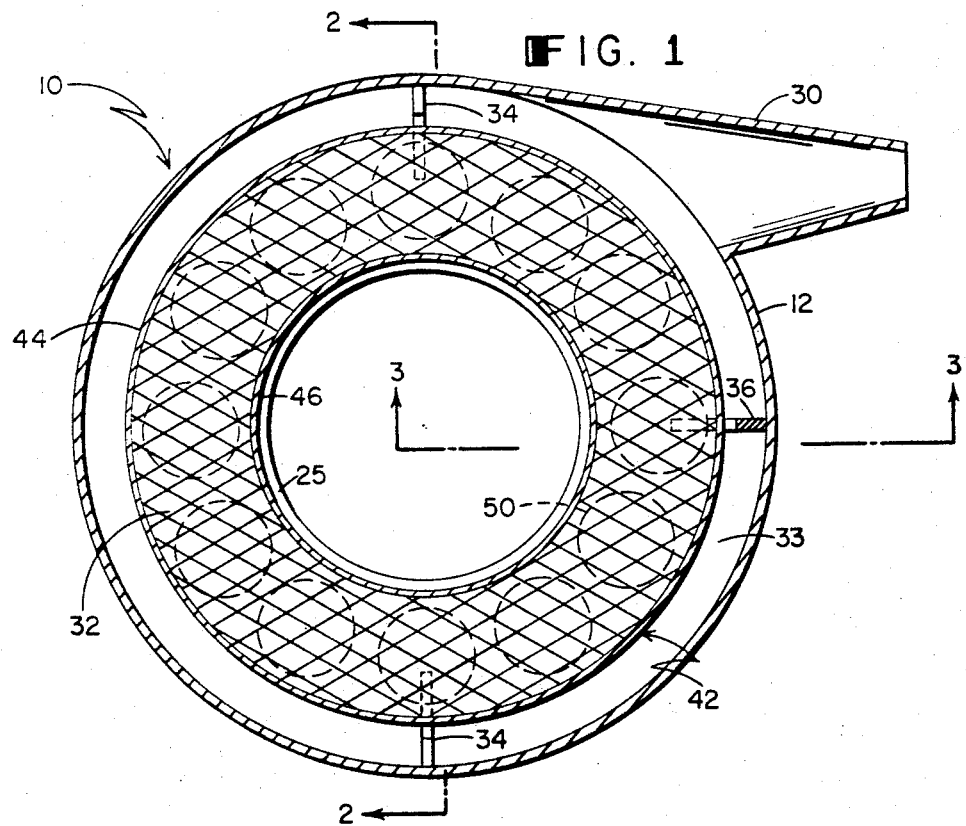
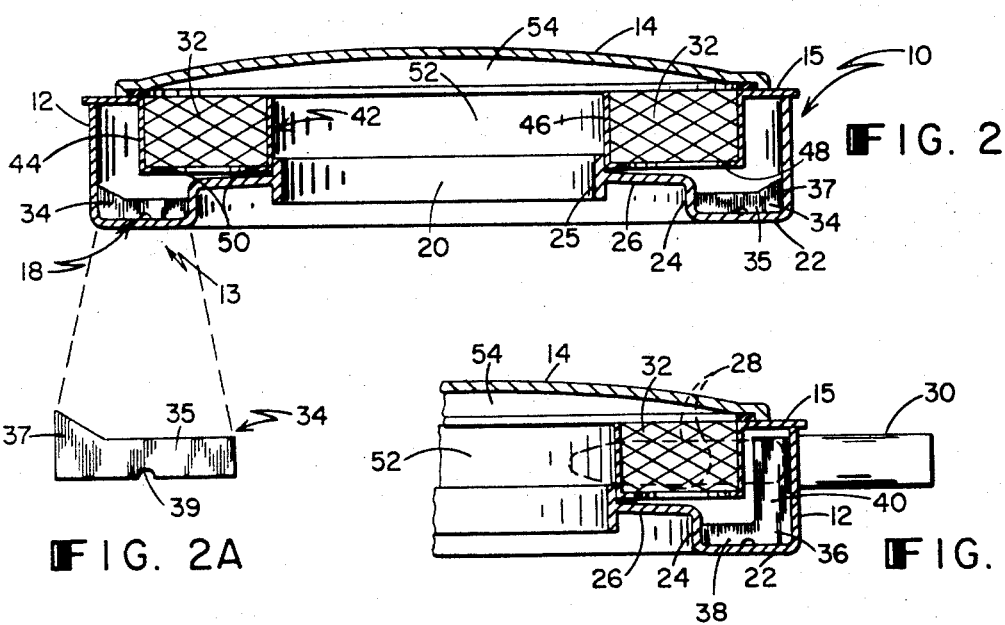

3,421,294
OIL BATH AIR CLEANER
Peter Eugene Sherburn, Chatham, Ontario, Canada, assignor, by mesne assignments, to Fram Corporation, Providence, R.I., a corporation of Delaware
Filed Apr. 18, 1967, Ser. No. 631,725
U.S. Cl. 55—237  11 Claims
Int. Cl. B01d 46/02

ABSTRACT OF THE DISCLOSURE

An oil bath air cleaner having an annular chamber for centrifugal air flow radially intermediate a circumferential wall of the housing of the air cleaner and a filter element mounted within the housing, an opening in the wall for introducing air into and causing the air to flow centrifugally in the chamber, an oil cup communicating with the chamber and an axial air outlet. A plurality of spaced barriers is provided in the cup for controlling oil flow caused by the centrifugal air flow and one of the barriers extends axially into the air flow chamber to provide a portion of reduced air flow cross-section therein.

---

This invention relates to oil bath air cleaners.

It is a primary object of the present invention to provide a highly efficient, centrifugal flow, oil bath air cleaner whose efficiency and dust holding capabilities are independent of air flow capacity and in which the probability that dust particles will be trapped is greatly increased without a corresponding increase in the amount of oil drawn into the filter element. Other objects include providing a silent, high capacity, easily cleaned and maintained air cleaner with greatly increased dust holding capacity and reduced dimensional tolerance requirements.

Generally speaking the invention in one aspect features an oil bath air cleaner having an annular chamber for centrifugal air flow radially intermediate a circumferential wall of the housing of the air cleaner and a filter element mounted within the housing, means including an opening in the wall for introducing the air into and causing the air to flow centrifugally in the chamber, an oil cup communicating with the chamber, and an axial air outlet. In another aspect the invention features an annular centrifugal air flow chamber, an annular oil cup in communication with the air flow chamber, and a cup portion of reduced oil flow cross-section for restricting flow of oil caused by the centrifugal air flow. In preferred embodiments the cup includes a plurality of circumferentially spaced barriers extending radially across the width of the sump for controlling oil flow caused by the centrifugal air flow, one of which is located on the downstream side of the air inlet and has a portion extending into the air flow chamber to provide a portion of reduced air flow cross-section therein.

Other objects, advantages, and features will appear from the following description of a preferred embodiment of the invention, taken together with the attached drawings, in which:

FIG. 1 is a sectional plan view of an air cleaner constructed according to the present invention;

FIG. 2 is a sectional view of the air cleaner of FIG. 1, the section being taken at 2—2;

FIG. 2a is a view of a component of the air cleaner of FIG. 2; and

FIG. 3 is a sectional view of a portion of the air cleaner of FIG. 1, the section being taken at 3—3.

Oil bath air cleaner 10 has an outer casing including cylindrical side wall 12, stepped bottom portion 13 defining annular oil cup 18 and central axial air outlet 20, and convex top 14 engaging peripheral flange 15 mounted on wall 12. Cup 18 is bounded by the lower part of wall 13, flat bottom wall 22, and inner circumferential wall 24. Flat annular wall 26 extends at a slight incline from the top of wall 24 to cylindrical member 25 defining outlet 20.

Diverging air inlet tube 30 is secured to wall 12 with its larger end surrounding tangential air inlet 28. An annular, rectangular cross-section fibrous filter element 32 is mounted in an annular, channel-shaped cross-section support 42 around member 25 between wall 26 and top wall 14 and extends radially about half-way across cup 18 to flange 15. Support 42 includes an impervious outer cylindrical wall 44 engaging the outer periphery of filter element 32, an impervious inner cylindrical wall 46 engaging the inner periphery of element 32, and a bottom wall 48 including a plurality of relatively large circular openings 50 adjacent the base of the filter element. Outer wall 44 and side wall 12 together define centrifugal air flow chamber above cup 18. Inner wall 46 defines an axial air flow chamber 52 connecting outlet 20 and an upper air chamber 54 defined by top wall 14 and the upper surface of filter element 32.

Two vertical oil metering dividers 34, circumferentially spaced 180° from each other, are mounted in cup 18. Each divider 34 extends fully across the sump, has at its bottom a small opening 39, and has a main radially innermost portion 35 slightly more than half the height of wall 24, and a radially outermost portion 37 that slopes upwardly toward wall 12 to a height equal to that of wall 24.

L-shaped combination oil metering air flow divider 36 (FIGS. 1, 3) is mounted inside wall 12 midway between dividers 34 on the downstream side of air inlet 28. Divider 36 has a base 38 extending fully across cup 18 and being of the same height as divider portions 35, and an upright portion 40 extending upwardly to within ¼ inch of flange 15 and radially from wall 12 about three-quarters of the distance to filter element 32.

In operation cup 18 is filled with oil to a depth of approximately three-fourths the height of divider portions 35. Air is introduced tangentially into the air cleaner through inlet tube and whirls centrifugally within air-flow chamber 33 and downwardly toward cup 18, impinging on the oil therein, and is then drawn upwardly through the full height of filter element 32 into upper chamber 54 and downwardly out of air cleaner 10 through chamber 52 and outlet 20.

The majority of the dust particles larger than 10 microns in size are separated from the air flow by centrifugal action and are collected in the oil film on the inside of wall 12. The lighter particles are trapped in the oil spray which rotates with the air, in the oil film on the inside of wall 12, and in the oil in cup 18. Less than 20% of the particles reach filter element 32.

Oil flow dividers 34 and base portion 38 of combination divider 36 limit the rotation of oil within cup 18 to provide proper oil metering, that is to insure that an excess amount of oil is not drawn into and, when the amount is excessive, through filter element 32. The limited, controlled amount of oil that is drawn into filter element 32 flows back into cup 18 over inclined annular wall 26.

The upright portion 40 of combination divider 36 also helps insure proper oil metering by controlling the centrifugal air flow velocity, thereby reducing the stirring and vortex action of the oil.

What is claimed is:
1. An oil bath air cleaner comprising:
a housing having a circumferential wall;
an annular filter element mounted within said housing;

an annular chamber having a first portion of predetermined air flow cross-section and a second portion having an air flow cross-section less than said predetermined cross-section radially intermediate said wall and said filter element for centrifugal air flow about an axis;

means including a tangential inlet through said wall for introducing air into and causing said air to flow centrifugally in said chamber;

an annular oil cup having at least one portion of restricted oil-flow cross-section for restricting flow or oil therein caused by said centrifugal air flow surrounding said axis in communication with said chamber; and, an outlet for removal of air from said air cleaner;

said second portion being located adjacent the downstream side of said inlet.

2. The oil bath air cleaner of claim 1 including an impervious cylindrical barrier surrounding and adjacent the outer periphery of said filter element for preventing air flow through said outer periphery.

3. The oil bath air cleaner of claim 1 and including an annular member of generally channel-shaped cross-section, said member having an impervious cylindrical outer portion surrounding and adjacent the outer periphery of said filter element, an impervious cylindrical inner portion surrounding and adjacent the inner periphery of said filter element and a base portion having a plurality of openings therein adjacent the base of said filter element.

4. The air cleaner of claim 1 in which said portion of said cup is a barrier having a surface parallel to said axis extending across said cup.

5. The air cleaner of claim 4 in which said barrier surface extends fully across said cup and said barrier includes a port for oil flow through said surface.

6. The air cleaner of claim 4 further comprising a second barrier having a surface parallel to said axis extending radially inwardly from said circumferential wall across a major portion of said chamber.

7. The air cleaner of claim 4 wherein a plurality of barriers are disposed in said cup spaced circumferentially from each other.

8. The air cleaner of claim 7 wherein one of said barriers includes a portion extending axially from said cup into said chamber, said portion having a surface parallel to said axis extending across a major portion of said chamber.

9. The air cleaner of claim 4 wherein said barrier surface has a first portion adjacent said circumferential wall and a second portion spaced radially inwardly of said wall, said second portion having a height less than that of said first portion.

10. The air cleaner of claim 1 wherein said second portion includes a barrier having a surface parallel to said axis extending across a major portion of said chamber.

11. The air cleaner of claim 10 in which said surface extends axially from within said cup to a point spaced from the top wall of said chamber opposite said cup.

References Cited

UNITED STATES PATENTS

| | | | |
|---|---|---|---|
| 505,977 | 10/1893 | Fletcher | 55—426 X |
| 1,818,742 | 8/1931 | Paradise | 55—459 X |
| 2,046,093 | 6/1936 | Schaaf et al. | 55—252 X |
| 2,279,626 | 4/1942 | Lehew | 261—72 X |
| 2,304,829 | 12/1942 | Kamrath | 55—251 |
| 2,432,757 | 12/1947 | Weniger | 55—459 X |
| 2,493,352 | 1/1950 | Kamrath | 55—251 |
| 2,514,543 | 7/1950 | Hamman | 55—252 X |
| 2,580,703 | 1/1952 | Russell | 55—320 X |
| 2,705,540 | 4/1955 | Zierer | 55—459 X |
| 2,810,451 | 10/1957 | Crisp | 55—246 X |

FOREIGN PATENTS

| | | |
|---|---|---|
| 201,047 | 12/1958 | Austria. |
| 55,781 | 2/1939 | Denmark. |
| 871,760 | 1/1942 | France. |
| 1,176,335 | 11/1958 | France. |
| 1,203,124 | 7/1959 | France. |
| 1,300,084 | 6/1962 | France. |
| 1,377,253 | 9/1964 | France. |
| 522,638 | 4/1955 | Italy. |

HARRY B. THORNTON, *Primary Examiner.*

D. E. TALBERT, JR., *Assistant Examiner.*

U.S. Cl. X.R.

55—246, 252, 337, 459, 494; 261—79